M. MARCILLE.
PNEUMATIC TIRE.
APPLICATION FILED DEC. 29, 1906.
926,347.
Patented June 29, 1909.
3 SHEETS—SHEET 1.
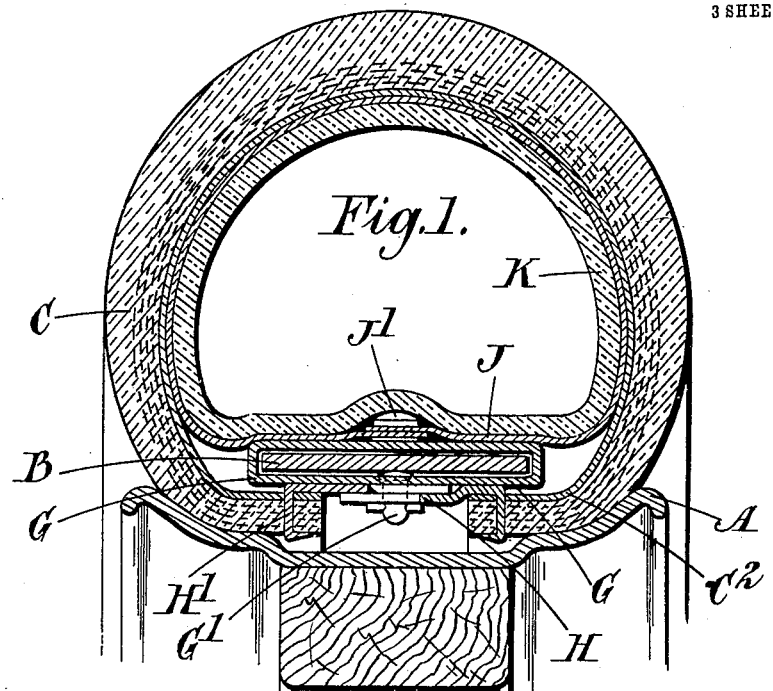
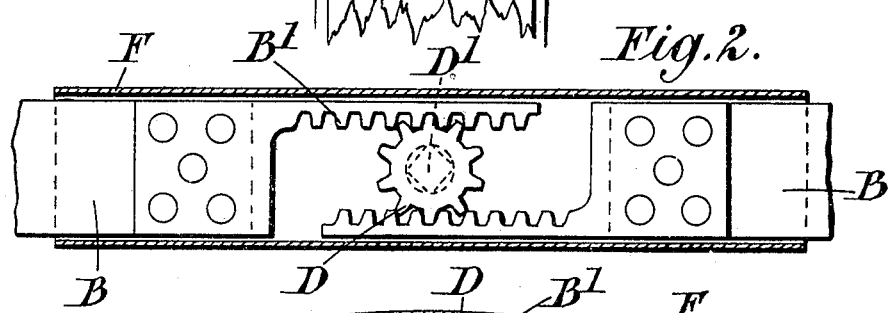
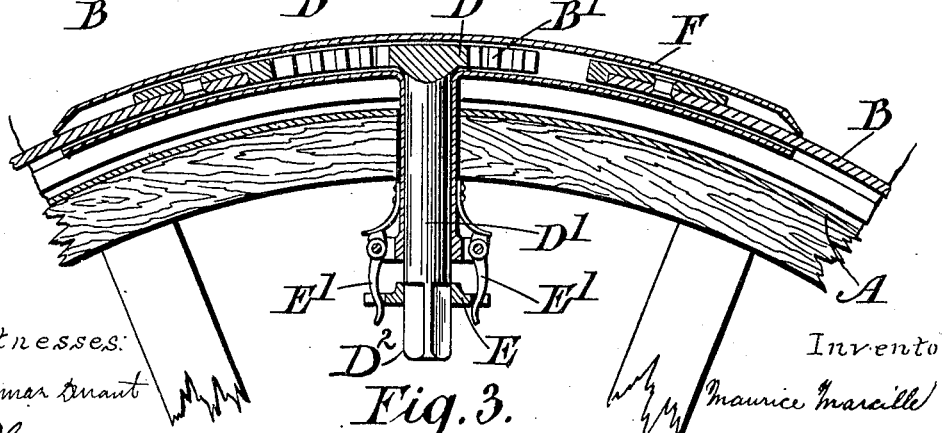

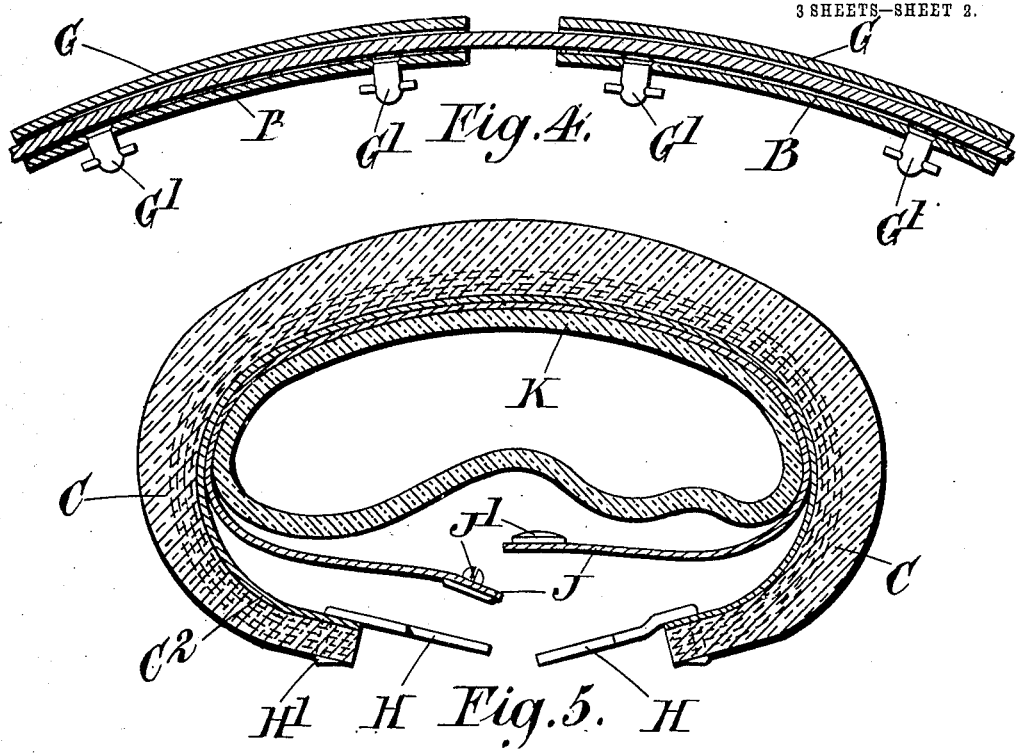
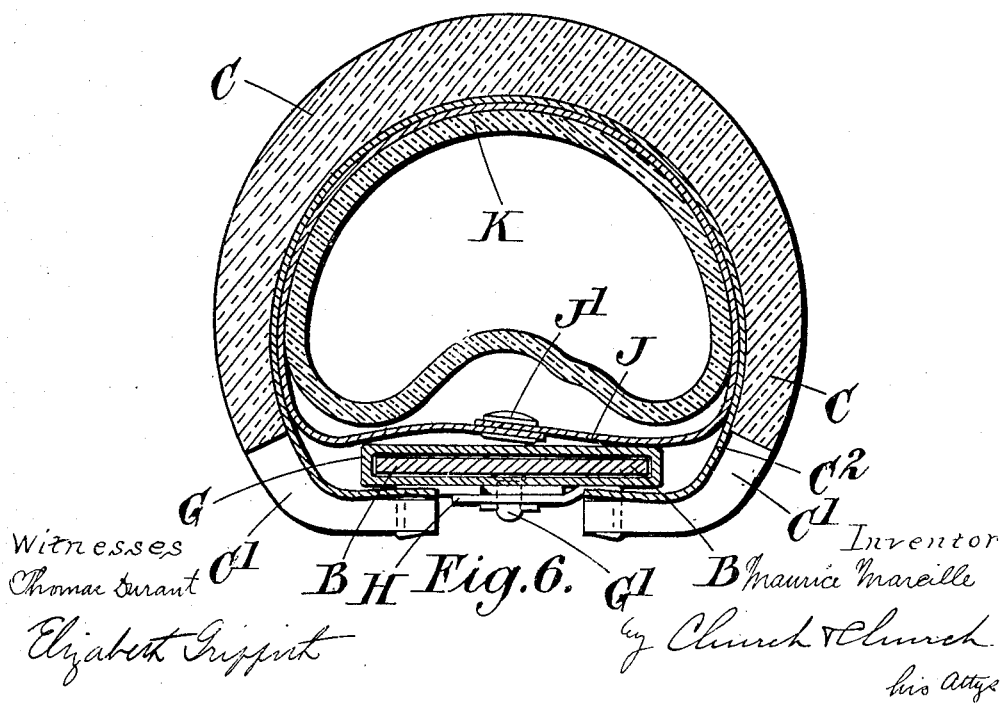

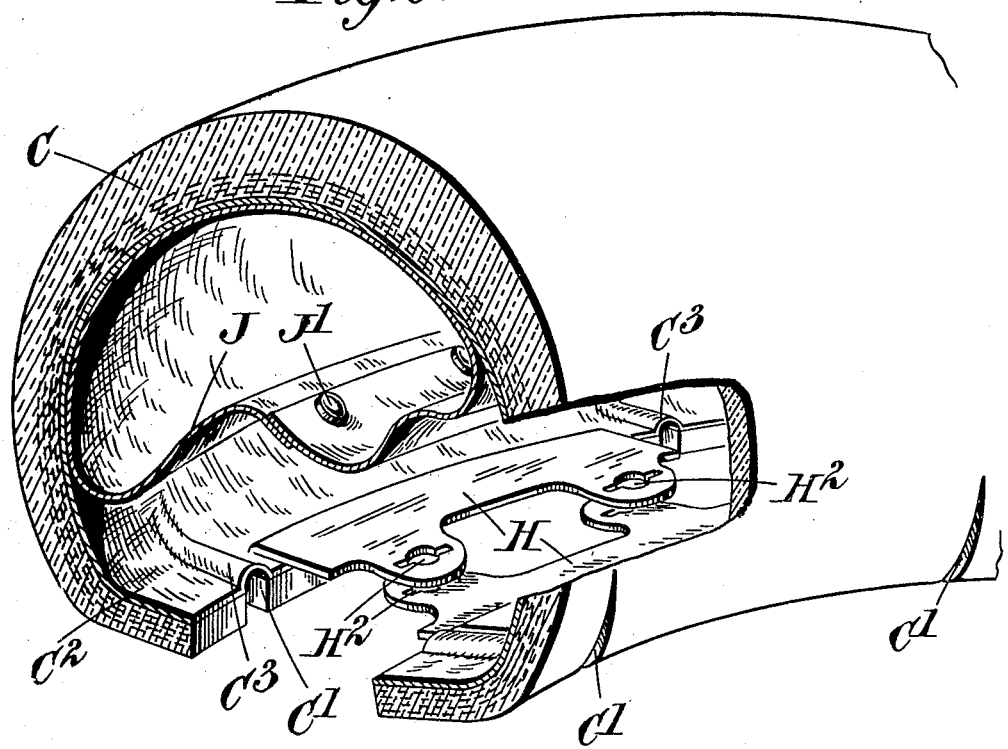
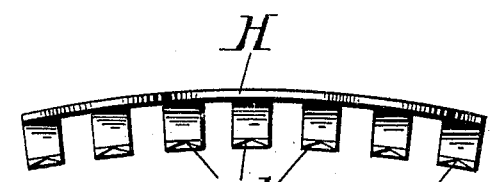
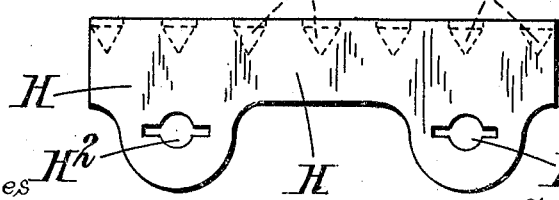

UNITED STATES PATENT OFFICE.

MAURICE MARCILLE, OF PARIS, FRANCE.

PNEUMATIC TIRE.

No. 926,347.  Specification of Letters Patent.  Patented June 29, 1909.

Application filed December 29, 1906. Serial No. 350,097.

*To all whom it may concern:*

Be it known that I, MAURICE MARCILLE, a citizen of the Republic of France, residing at Paris, in France, have invented certain new and useful Improvements in Pneumatic Tires, of which the following is a specification.

This invention relates to pneumatic tires, its object being the construction of a tire which can be very readily removed from and placed upon the rim.

According to this invention a gripping band is provided which holds the edges of the tire cover upon the rim. This band is provided with mechanism, preferably a rack and pinion, so that it can be tightened or loosened, and the edges of the tire cover are so formed that they can be expanded or contracted by the hand. This is preferably accomplished by dividing the edges of the tire cover, or the outside portions of them, and providing them with an undivided flexible lining which can be the ordinary canvas lining of the cover.

The tire cover edges are provided with fastening members so that before the cover is placed on the rim, the edges can be secured under the gripping band so that the tire forms a tube. These fastening devices are conveniently in the form of plates attached to the edges of the cover and provided with openings or slots which pass over studs or buttons mounted on sleeves attached to the gripping band. These sleeves are preferably slidable on the band so that when the band is expanded to remove the tire, or contracted to clamp it upon the rim, the edges of the tire cover will expand and contract uniformly with it.

In the accompanying drawings which illustrate one construction of tire according to this invention, Figure 1 is a cross section through the tire and rim, Fig. 2 is a plan of the gripping band mechanism, Fig. 3 is a longitudinal section through a portion of the rim and gripping band mechanism, Fig. 4 is a longitudinal section through another portion of the gripping band. Figs. 5 and 6 are cross sectional views showing the tire in various stages of the process of assembling the parts. Figs. 7 and 7ª are detailed views of one of the fastening members, and Fig. 8 is a perspective view of a portion of the tire cover.

Like letters indicate like parts throughout the drawings.

The rim A is permanently mounted in any convenient way upon the periphery of the wheel, and the gripping band B is of such a size as to encircle it and is capable of being tightened down upon it in order to grip the edges of the cover C. The gripping band B is divided at one portion of its length, and to its ends are secured toothed racks $B^1$ (Fig. 2) which engage with a pinion D. This pinion is carried on the end of a stem $D^1$ which passes down through a slot or hole provided for the purpose in the rim A, and is furnished with a squared end $D^2$ (Fig. 3) by means of which it may be rotated to expand or contract the gripping band. A notched or toothed ring E (Fig. 3) is attached to this stem, and pivoted pawls $E^1$ engage with the ring to retain the stem in any desired position and prevent its accidental rotation. The racks $B^1$ and pinion D are inclosed in a light metal casing F. The band B is provided with a number of sleeves G (Fig. 4) which are capable of sliding upon the band and are furnished with rotatable studs or buttons $G^1$.

The edges of the tire cover C are cut as at $C^1$ (Fig. 8), the cuts being preferably V-shaped so that the edge as a whole may be able to contract and expand upon the rim. These cuts preferably extend through the outer portion of the edge of the cover, that is the portion usually made of leather or vulcanized rubber, but do not pass through the canvas or other flexible lining $C^2$ which is left undivided so that it forms, when the edge of the tire is contracted, little folds as at $C^3$ (Fig. 8).

The edges of the tire are provided with fastening members H, one of which is shown in detail in Figs. 7 and 7ª. They are preferably made of metal plates secured to the edge of the tire by teeth $H^1$ and having slots $H^2$ which are adapted to pass over the heads of the studs $G^1$ and be retained in place by them.

It will be seen from Fig. 8 that the fastening members H are placed opposite to each other upon the edges of the tire cover, and from Fig. 1 that each stud $G^1$ engages with two of the members H. As the sleeves G slide upon the band B it is evident that as the band is contracted or expanded by the rack and pinion, the sleeves can adjust themselves upon it and cause the uniform contraction or expansion of the tire cover necessary for its easy removal or insertion.

Within the tire cover are canvas or other flexible strips J; these are provided with fasteners J¹ which can conveniently be snap fasteners similar to those used for fastening gloves and the like, and the function of the bands is to come between the inner tube K and the gripping band B to protect the tube from damage.

Fig. 5 shows the various parts of the tire in course of assembling before they are placed upon the rim. The inner tube K is first inserted and then (see Fig. 6) the protective bands J are fastened over it and the band B put in place in the edges of the tire cover C. The fasteners H are then secured by the studs G¹ to the sleeves G, and the inner tube inflated. The spindle D¹ is then rotated by means of a key or handle and the gripping band B expanded, thus causing the tire to assume a larger diameter so that it may be placed over the edge of the rim A. When in position, the band is tightened down and grips the edges of the tire firmly in place upon the rim, the parts assuming the position shown in Fig. 1. The pivoted pawls E′ act as a retaining mechanism so that the gripping band is retained either in its expanded or contracted position secure from accidental alteration.

The usual passage to admit the valve for inflating the inner tube is formed as a slot or hole at some convenient place in the rim.

What I claim as my invention and desire to secure by Letters Patent is—

1. The combination of a wheel-rim, a tire-cover, a gripping band, sleeves slidable upon said band, studs on the sleeves, fastening members on the tire-cover adapted to engage with the studs, and means for tightening and loosening the band.

2. The combination of a wheel-rim, a tire cover having cuts in its edges, a flexible lining covering said cuts, a gripping band, racks on said band, and a pinion engaging said racks to tighten and loosen the band.

3. The combination of a wheel-rim, a tire cover having cuts in its edges, a flexible lining covering said cuts, a gripping band, racks on said band, a pinion engaging with said racks to tighten and loosen the band to grip the tire on the rim, sleeves slidable on said band, studs on the sleeves and fastening members on the tire cover adapted to engage with the studs.

4. The combination of a wheel-rim, a tire cover having cuts in its edges, a flexible lining covering said cuts, a gripping band, racks on said band, a pinion engaging with said racks to tighten and loosen the band to grip the tire on the rim, a toothed ring carried by the pinion stem and pawls engaging said ring to retain the band in any position to which it may be set by the action of the pinion, sleeves slidable on said band, studs on the sleeves and fastening members on the tire cover adapted to engage with the studs.

5. The combination of a wheel-rim, a tire cover having cuts in its edges, a flexible lining covering said cuts, a gripping band, racks on said band, a pinion engaging with said racks to tighten and loosen the band to grip the tire on the rim, sleeves slidable on said band, studs on the sleeves, fastening members on the tire cover adapted to engage with the studs, an inner tube and protective bands engaging by means of snap fasteners and disposed between the inner tube and the gripping band.

6. The combination of a wheel-rim, a tire cover having cuts in its edges, a flexible lining covering said cuts, a gripping band, racks on said band, a pinion engaging with said racks to tighten and loosen the band to grip the tire on the rim, a notched ring carried by the pinion stem and pawls engaging said ring to retain the band in any position to which it may be set by the action of the pinion, sleeves slidable on said band, studs on the sleeves, fastening members on the tire cover adapted to engage with the studs, an inner tube, and protective bands engaging by means of snap-fasteners and disposed between the inner tube and the gripping band.

In testimony whereof I have signed my name to this specification in the presence of two subscribing witnesses.

MAURICE MARCILLE.

Witnesses:
P. FLOUREN,
R. ROUMARTI.